United States Patent [19]

McClung, IV

[11] Patent Number: 5,076,045
[45] Date of Patent: Dec. 31, 1991

[54] GRASS CATCHER

[76] Inventor: Guy L. McClung, IV, 8130 Vintage Creek, Spring, Tex. 77379-4578

[21] Appl. No.: 607,463

[22] Filed: Oct. 30, 1990

[51] Int. Cl.⁵ .......................................... A01D 34/70
[52] U.S. Cl. ....................................... 56/202; 56/199
[58] Field of Search ............... 56/16.6, 194, 199, 200, 56/201, 202, 203, 205, 206

[56] References Cited

U.S. PATENT DOCUMENTS

| | | | |
|---|---|---|---|
| 370,361 | 9/1887 | Twiggs | 56/199 |
| 2,517,335 | 8/1950 | Muzzy | 56/201 X |
| 2,955,404 | 10/1960 | Strasel et al. | 56/202 |
| 2,983,095 | 5/1961 | Barth | 56/202 |
| 2,984,850 | 5/1961 | Law et al. | 56/202 X |
| 3,517,493 | 6/1970 | Kiteley | 56/194 |
| 3,757,503 | 9/1973 | Soldavini | 56/202 |
| 4,250,698 | 2/1981 | Pappalardo et al. | 56/202 |
| 4,265,079 | 5/1981 | Hoffmann | 56/202 |
| 4,345,418 | 8/1982 | Arizpe | 56/202 |
| 4,444,002 | 4/1984 | Heismann et al. | 56/202 |
| 4,522,019 | 6/1985 | Edwards et al. | 56/202 |
| 4,574,568 | 3/1986 | Trelford | 56/202 |
| 4,631,909 | 12/1986 | McLane | 56/202 |
| 4,637,203 | 1/1987 | Fedeli | 56/202 |
| 4,648,238 | 3/1987 | Greider et al. | 56/202 |
| 4,665,684 | 5/1987 | DiPaolo | 56/202 |
| 4,702,063 | 10/1987 | Satoh et al. | 56/202 |
| 4,747,259 | 5/1988 | Kline et al. | 56/202 |
| 4,843,805 | 7/1989 | Satoh | 56/202 |
| 4,846,588 | 7/1989 | Allen | 383/41 |

FOREIGN PATENT DOCUMENTS

| | | | |
|---|---|---|---|
| 144093 | 11/1950 | Australia | 56/203 |
| 70672 | 1/1983 | European Pat. Off. | 56/202 |
| 88279 | 9/1983 | European Pat. Off. | 56/202 |

*Primary Examiner*—David J. Bagnell
*Attorney, Agent, or Firm*—Guy McClung

[57] ABSTRACT

A catcher for material such as grass, leaves, and debris, the catcher connectible to a mower for receiving material discharged by the mower, the catcher having a hollow container and apparatus for moving material out of the container and, in one aspect, one or more access openings for accessing material in the container, particularly compacted or difficult-to-move material.

6 Claims, 2 Drawing Sheets

GRASS CATCHER

FIELD OF THE INVENTION

This invention is directed to bags, containers and catchers for receiving, holding and discharging grass and other material and, in one aspect, to such items having apparatus for facilitating the discharge of the materials.

DESCRIPTION OF RELATED ART

Your applicant for patent is thirteen years old, weighs about ninety-five pounds and is five feet six inches tall. Often in attempting to remove grass from a lawn mover's grass catcher the applicant has encountered difficulty in getting all of the grass out. This is particularly difficult when the grass catcher is substantially full with closely compacted grass. This can be difficult even for larger individuals who can hold the grass catcher up above a bag or garbage can and shake it vigorously. Frequently the only solution is for a person to reach into the catcher through its discharge opening and manually free or manipulate compacted grass, leaves, pine needles, or whatever material has been mowed.

In accordance with 37 C.F.R. §1.56 the following are disclosed:

U.S. Pat. No. 4,846,588 discloses a debris collection bag for a lawn mower with a rear zipper opening U.S Pat. No. 4,843,805 discloses a grass catcher bag for a mower.

U.S. Pat. No. 4,747,259 discloses a grass catcher assembly with disposable bags.

U.S. Pat. No. 4,702,063 discloses a grass collecting bag for a mower, the bag having a separable cover member.

U.S. Pat. No. 4,665,684 discloses a grass catcher for a mower, the catcher having a rear wall hingedly connected to the catcher.

U.S. Pat. No. 4,648,238 discloses a removable grass catcher formed of two molded pieces.

U.S. Pat. No. 4,637,203 discloses a grass collecting vessel with a movable wall member for cleaning a grass conveying duct.

U.S. Pat. No. 4,631,909 discloses a mower with a grass catcher.

U.S. Pat. No. 4,574,568 discloses a collecting box for debris generated by a lawn mower.

U.S. Pat. No. 4,522,019 discloses a grass catching receptacle with a lid hingedly connected to its main container body.

U.S. Pat. No. 4,444,002 discloses a grass catcher for a mower with a removable cover.

U.S. Pat. No. 4,345,418 discloses a mounting for a disposable grass catching bag for a mower.

U.S. Pat. No. 4,265,079 discloses a grass catcher for a mower made from two nestable pieces.

U.S. Pat. No. 4,250,698 discloses a molded plastic grass catcher for a mower.

U.S. Pat. No. 3,757,503 discloses a grass collector for a mower.

U.S. Pat. No. 3,517,493 discloses a grass catcher for a mower.

U.S. Pat. No. 2,983,095 discloses a grass catcher for a mower with separable sections.

U.S. Pat. No. 2,955,404 discloses a grass catcher for a mower with separable sections.

There has long been a need for a grass catcher from which grass, leaves, debris, or other mown materials may be easily discharged. There has long been a need for such catchers with apparatus for facilitating the removal of material from them.

SUMMARY OF THE INVENTION

The present invention is directed to a grass catcher which, in one embodiment, has a grass container which is hollow and has an opening through which grass, leaves, pine needles, debris, or other mowed material may pass. This material is also discharged through the opening. A plate is movably mounted in the container for jarring and moving material therein, particularly material which has become compacted due to the discharge force of the mower. The plate can be moved from the exterior of the container in a variety of ways, including but not limited to: gripping and manually moving a bar that extends from the interior of the container where it is connected to the plate to the container's exterior, the bar moving in a slot in the body of the container; pushing the plate by hand from the rear of the plate by inserting a hand through a rear opening in the container; or by pulling a cord connected to the plate, the plate hingedly connected within the container. Sealable access openings can be provided at desired locations on the container so that compacted material can be accessed at a point of compaction. In one aspect the movable plate has flexible lips so that material cannot flow around the plate to exit through an access hole. In another aspect, the slot for a bar connected to the plate has flexible rubber lips so that material is inhibited from escaping through the slot. In another aspect, the movable plate is connected to the container by springs so that upon manual movement of the plate it returns to its original position.

It is, therefore, an object of the present invention to provide a new, useful, unique, efficient and nonobvious collector or catcher for material such as mown grass and other materials.

Another object of the present invention is the provision of such a catcher with apparatus for facilitating the discharge of material from the catcher.

Yet another object of the present invention is the provision of such apparatus which is operable exteriorly of the catcher.

A further object of the present invention is the provision of such catchers in which the escape of material through openings associated with the apparatus is inhibited.

An additional object of the present invention is the provision of such catchers with sealable openings providing access to the interior of the catcher.

These and other objects will be clear from the following description of preferred embodiments and the attached drawings.

DESCRIPTION OF THE DRAWINGS

FIG. 8 is a front elevational view of the catcher of FIG. 7.

DESCRIPTION OF EMBODIMENTS PREFERRED AT THE TIME OF FILING FOR THIS PATENT

Figure 1:
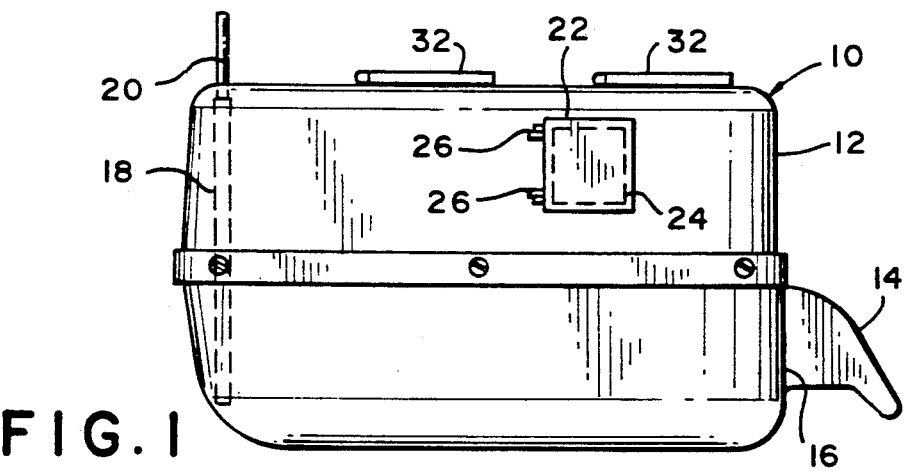
FIG. 1 is a side elevational view of a catcher according to the present invention.

Referring now to FIG. 1, a grass catcher 10 according to the present invention has a container 12 with a flow trough 14 disposed at an opening 16 through which grass flows. A plate 18 is movably disposed within the container 12 and has a bar 20 secured thereto which extends outside the container 12. An access door 22 sealingly closes off an opening 24 through which access to grass within the container 12 is possible. The door 22 is hingedly connected by hinges 26 to the container 12.

Figure 2:
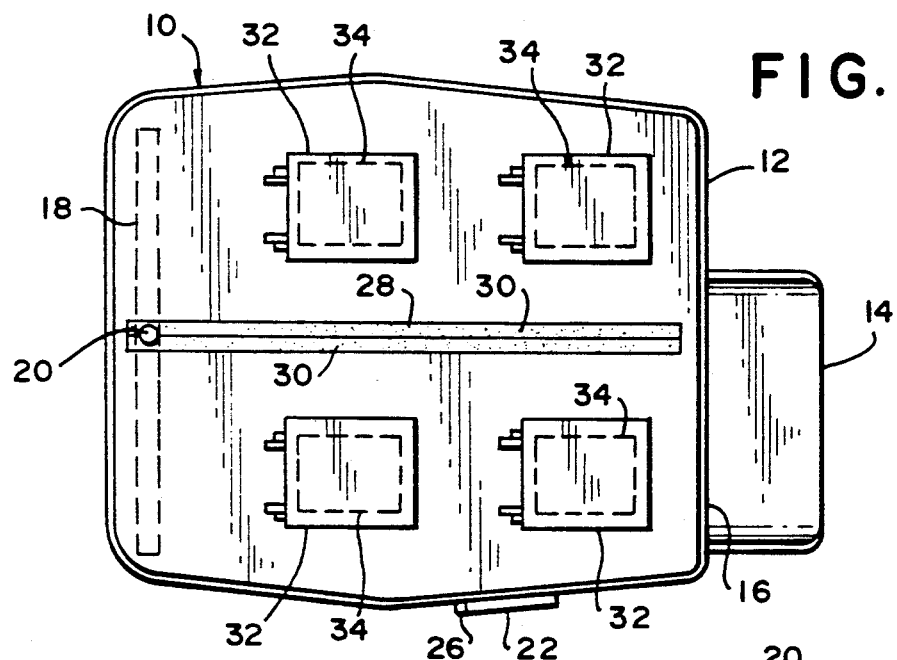
FIG. 2 is a top plan view of the catcher of FIG. 1.
Figures 3, 4:
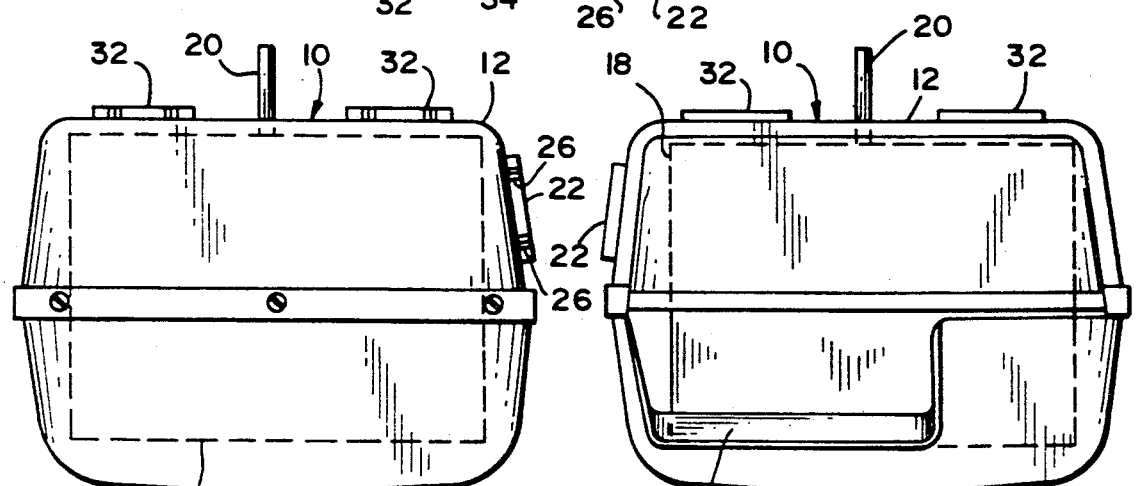
FIG. 3 is a rear elevational view of the catcher of FIG. 1.
FIG. 4 is a front elevational view of the catcher of FIG. 1.

FIG. 2 illustrates a slot 28 in which the bar 20 moves, the slot 28 having flexible lips 30 mounted thereover to inhibit the escape of grass from within the container 12 during and after mowing. The catcher 10 may be connected to and supported by a mower with any conventional means. A plurality of access doors 32 (like the door 22) are hingedly connected to sealingly close off openings 34 in the top of the container 12. FIGS. 3 and 4 present a rear view and front view, respectively, of the catcher 10.

Figure 5:
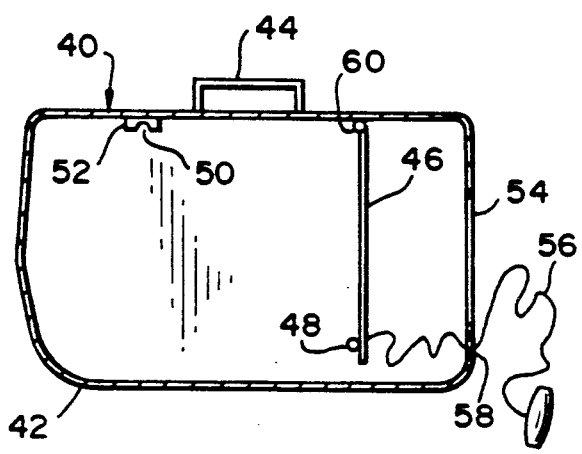
FIG. 5 is side cross-sectional view of a catcher according present invention.
Figure 6:
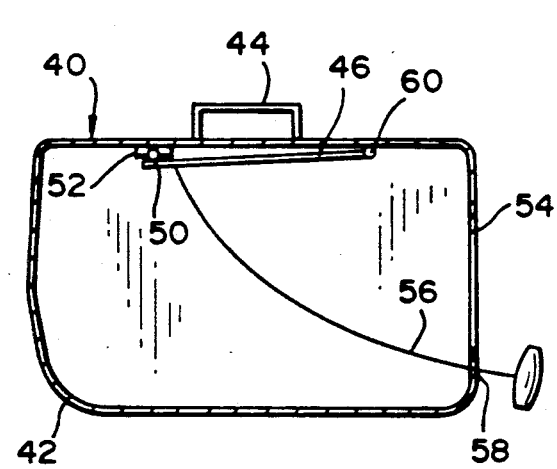
FIG. 6 is a side cross-sectional view of the catcher of FIG. 5.

Referring now to FIGS. 5 and 6, a catcher 40 according to the present invention has a hollow container 42 (like container 12, FIG. 1) with a lifting handle 44. A plate 46 is hingedly and movably connected to the top interior of the container 42 by a hinge 60. As shown in FIG. 6, the plate 46 can initially be held in place at the top of the container 42 by releasably emplacing a bead 48 on the plate 46 in a recess 50 in a plate holder 52 at the top of the container. As shown in FIG. 5, the plate may be moved in a downward arc, pushing grass ahead of it to an opening 54, by pulling on a cord 56 attached to the plate 46 and extending through an opening 58 in the container 42. An access door like the door 22 (FIG. 1) may be provided on the container 42 to cover an opening (not shown) for facilitating positioning of the plate 46 at the top of the container or this may be accomplished through the opening 54.

Figure 7:
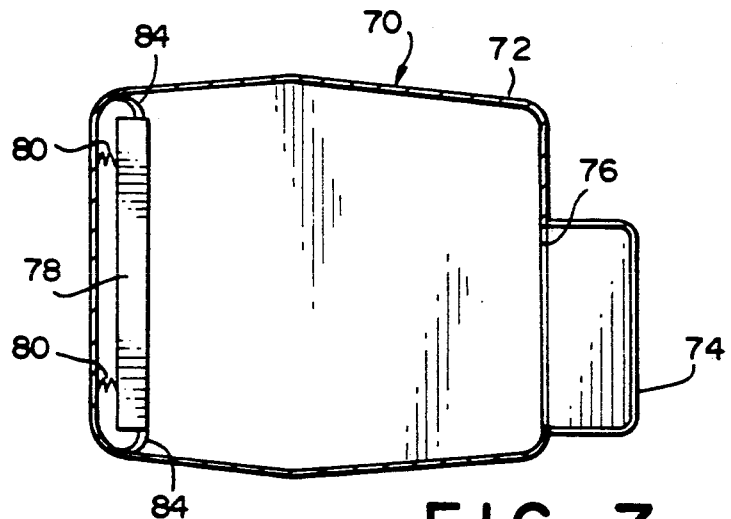
FIG. 7 is top cross-sectional view of a catcher according to the present invention.
Figure 8:
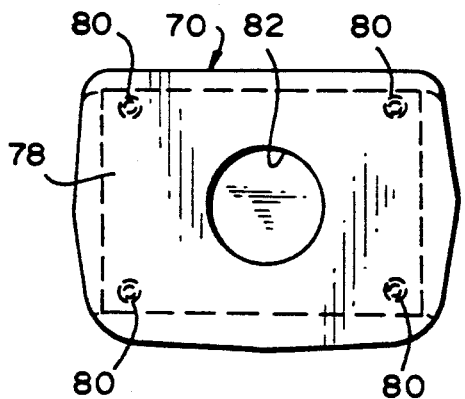
FIG. 8 is a rear elevational view of the catcher of FIG. 7.
Figure 9:
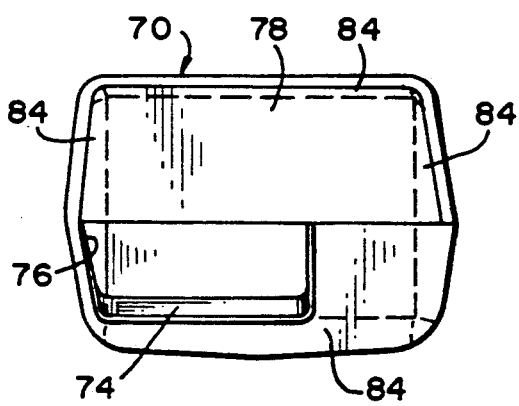

Referring now to FIGS. 7, 8, and 9, a catcher 70 according to the present invention has a hollow container 72 and a flow trough 74 disposed at a material flow opening 76 through which material (e.g. leaves, debris, grass, etc.) flows into and out of the container 72. A plate 78 is movably mounted within the container 72 by springs 80 which are interconnected between the plate 78 and the interior of the container. A hole 82 is provided in the rear of the container 72 through which an operator's hand may be inserted to move the plate 78 to jar or move material within the catcher 70. The springs 80 return the plate 78 to its initial position after the plate moves. Flexible lips 84 connected to the plate 78 inhibit the passage of material around the plate 78 to the hole 82. Alternatively, the lips can be connected to the interior of the container 72 and be in contact with the plate 78.

The appended claims are intended to cover my invention and any of its legal equivalents.

What is claimed is:

1. A material catcher for use with a mower, the catcher connectable to the mower to receive material discharged by the mower, the catcher comprising
   a hollow container for holding the material, the container having an opening through which the material flows,
   a plate movably disposed within the container for facilitating discharge of the material from the container,
   a bar secured to the plate for moving the plate from the exterior of the container, the bar extending beyond the container and disposed in and movable in a slot in the container, and
   flexible lips mounted at the slot, the bar movable between the lips and the lips inhibiting the escape of material through the slot.

2. A material catcher for use with a mower, the catcher connectable to the mower to receive material discharged by the mower, the catcher comprising
   a hollow container for holding the material, the container having an opening through which the material flows,
   a movable plate hingedly connected at one end to the top of the container, the other end releasably securable to the top of the container,
   a cord secured to the plate and passing through a hole in the container to the exterior of the container, pulling the cord releasing the other end of the plate so that the plate contacts material in the container to facilitate its discharge therefrom, and
   a plurality of access openings in the container through which access is permitted to material in the container, a movable door secured at each opening to sealingly close off each opening.

3. A material catcher for use with a mower, the catcher connectable to the mower to receive material discharged by the mower, the catcher comprising
   a hollow container for holding the material, the container having an opening through which the material flows,
   a plate movably disposed within the container for facilitating discharge of the material from the container, and
   means for moving the plate from the exterior of the container, said means comprising
   a bar connected to the plate and extending outside the container, and
   the bar movable in a slot in the container.

4. The catcher of claim 3 wherein flexible lips are mounted at the slot to inhibit the escape of material through the slot.

5. The catcher of claim 3 wherein at least one access opening is provided in the container for accessing material in the container, and
   a movable door connected to the container for each of the at least one access openings to sealingly close off each opening.

6. A material catcher for use with a mower, the catcher connectable to the mower to receive material discharged by the mower, the catcher comprising
   a hollow container for holding the material, the container having an opening through which the material flows,
   a plate movably disposed within and spring-mounted to the container for facilitating discharge of the material from the container, and
   the container having a hole therein though which the plate is manually movable.

* * * * *